June 22, 1954  J. HALTENBERGER  2,681,688
AUTOMOBILE ELECTRIC INDEPENDENT SEAT ADJUSTMENT
Filed Feb. 23, 1950  2 Sheets-Sheet 1

Inventor
Jules Haltenberger
ATTORNEY

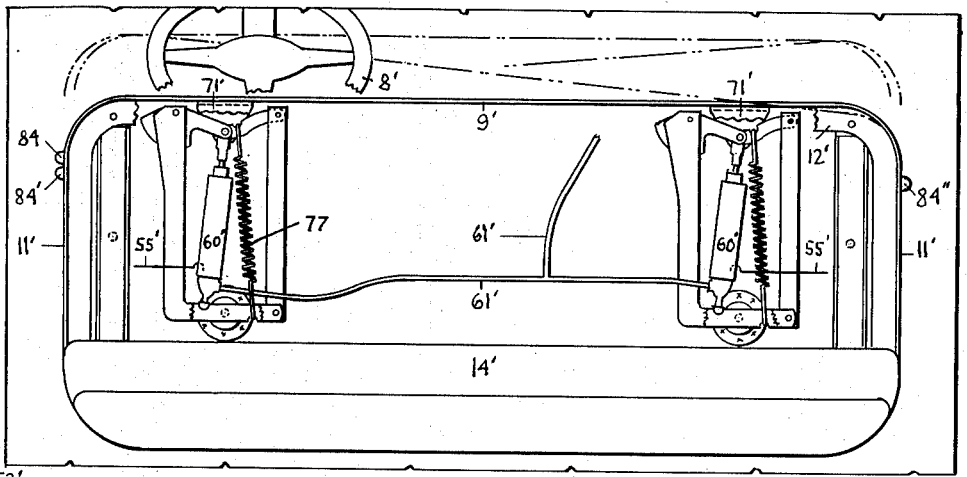
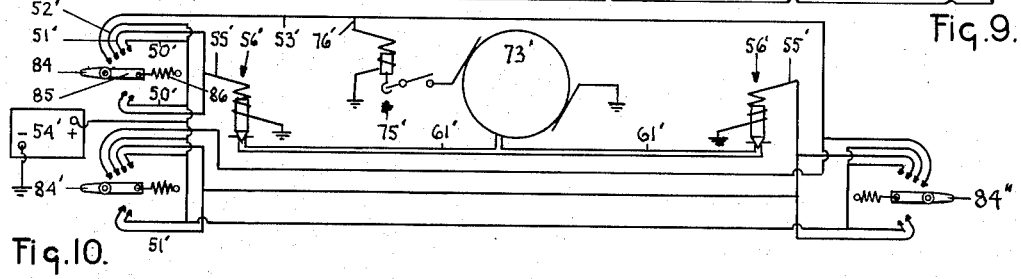
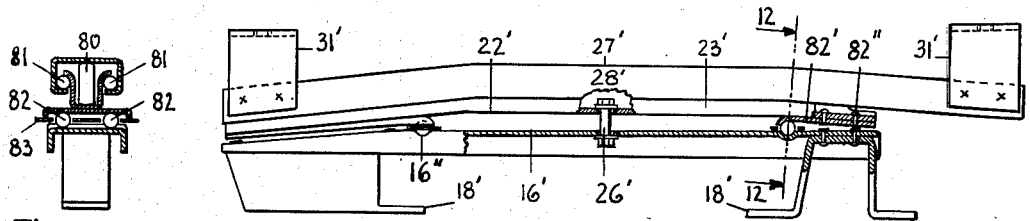
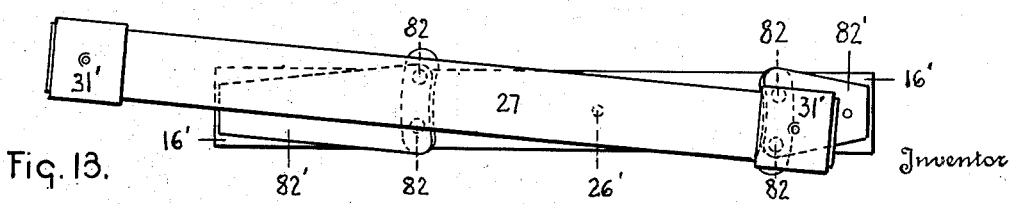

Patented June 22, 1954

2,681,688

UNITED STATES PATENT OFFICE 2,681,688

AUTOMOBILE ELECTRIC INDEPENDENT SEAT ADJUSTMENT

Jules Haltenberger, Rancho Santa Fe, Calif.

Application February 23, 1950, Serial No. 145,857

5 Claims. (Cl. 155—14)

The present is similar embodiment to my co-pending patent applications, Serial No. 23,152 for "Automobile Front Seat Adjustment," filed April 26, 1948, now abandoned, and Serial No. 64,208 for "Motor Vehicle Independent Seat Control" filed December 8, 1948. Now practically all automobile manufacturers produce an open top, and also a light metal top model, wherein the usual undivided front seat adjustment is operated by an electro-hydraulic system. The constructions applicant is aware of, provide for a two directional electric switch, disposed on the seat driver's side wall, when operating same, the controls move the seat fore or rearwardly in constant parallelism.

It is here proposed, and it is the object of my invention, to provide a usual unitary front seat with a selective seat end electro-hydraulic control, disposed on the seat, with one or two electro-hydraulic power jacks under the seat and in the preferred form, to provide two electric switch controls on the driver's side, resulting in selective seat adjustment forward or rearward of either of the seat ends for seat diagonal adjustment. When however, the driver operates the two controls in unison, a usual parallel seat adjustment is arrived at.

A further object is to provide a selective seat end adjustment while retaining the present proven electro-hydraulic system and electric control, and to incorporate inexpensive duplicates thereof. Further objects will appear as the description proceeds.

Figure 1:
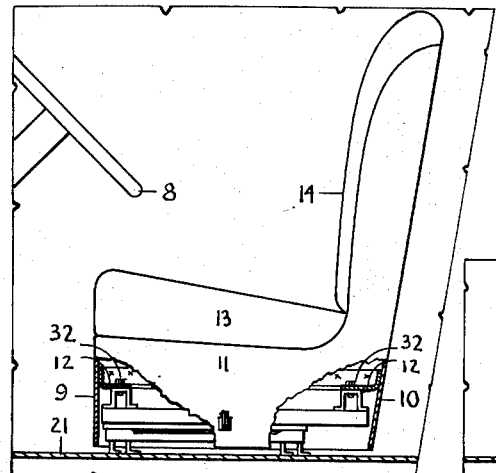
Figure 8:
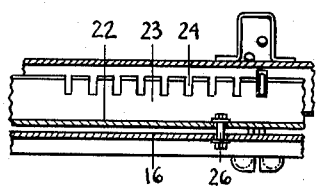
Figure 2:
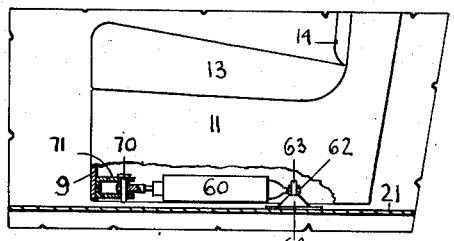
Figures 3, 6:
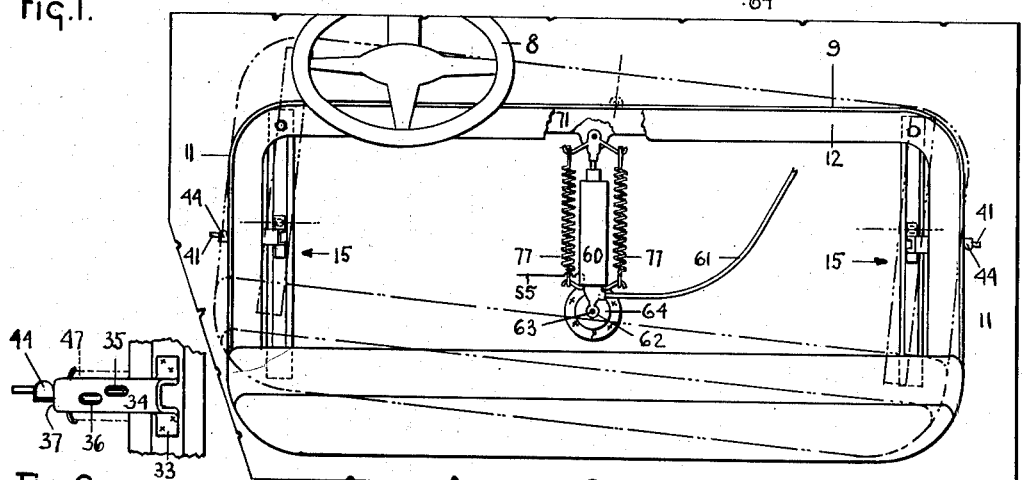
Figures 4, 5:
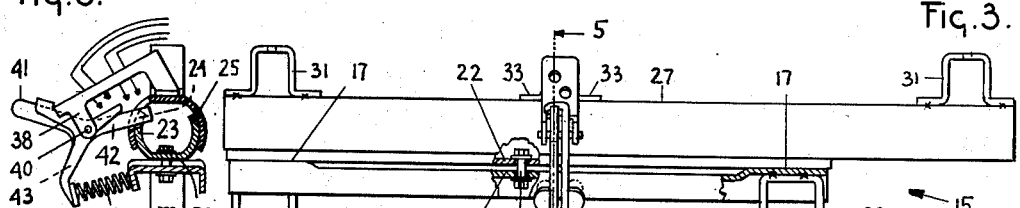
Figure 7:
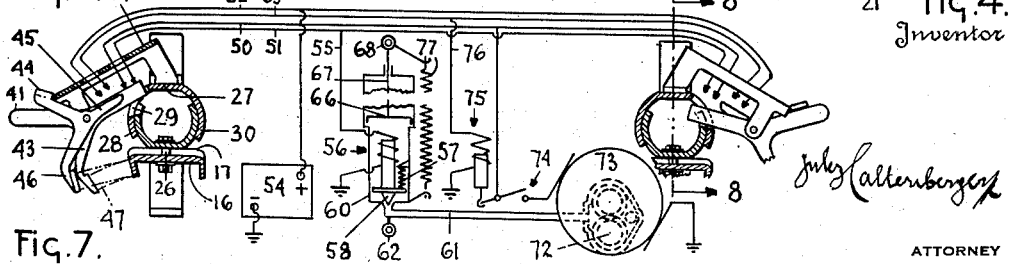

Referring to the drawings: Fig. 1 is a side elevation of an automobile front seat, in the extreme rear position, with parts broken away, and showing the seat rack; Fig. 2 is similar to Fig. 1 showing the hydraulic jack and mounting; Fig. 3 is a plan view of the seat, with the seat cushion left out; Fig. 4 illustrates the seat rack shown in Fig. 1, here shown in a larger scale; Fig. 5 is a section substantially on line 5—5 of Fig. 4; Fig. 6 is a top view of a part of Fig. 5; Fig. 7 is a section substantially on line 5—5 of Fig. 4 and associated parts, including, the schematical presentation of the electro-hydraulic controls and the passenger end seat supporting rack; Fig. 8 is a section substantially on line 8—8 of Fig. 7; Fig. 9 is a plan view of an automobile front seat in extreme rear position, a modification of the invention; Fig. 10 is a wiring diagram for Fig. 9; Fig. 11 is a side elevation of one of the seat racks shown in Fig. 9, here illustrated in a larger scale; Fig. 12 is a section substantially on line 12—12 of Fig. 11; Fig. 13 is a plan view of the seat rack shown in Fig. 11, here shown in forwardly extended position.

Referring to Figs. 1 to 8 inclusive, it will be seen that close to a usual steering wheel 8, a usual unitary automobile front seat, here shown in extreme rear position, is formed by a transversely extending front frame wall 9, seat rear frame wall 10 and interconnecting side walls 11. Inbetween these seat walls, a usual seat supporting tray 12 is secured as by spot welding. The seat is provided with a usual cushion 13 and back rest 14. The seat is adjustably supported by a pair of usual telescoping seat racks generally at 15. These, for simplicity of presentation, are shown as being formed of part circles, and in constant free sliding contact.

Seat rack unit 15 provides a stationary U-shaped channel member having a depressed top surface wall 16, terminating in higher level smooth surfaces 17. Under surfaces 17, as by spot welding, supporting legs terminating in securing lips 18 are provided. Lips 18 as by cap-screws 20 (indicated in Figs. 4 and 5) secure the U-shaped channel to the usual floor 21.

The seat rack 15 is composed of stationary, pivotally, and telescopically slidable members. As is clear from the drawings, an inner telescope member is formed of a flattened wall 22, and therewith integral part circle wall 23, provided with closely spaced seat locating notches 24, and an opposed part circle wall 25 respectively. Walls 16 and 22 are operatively interconnected by a pivot bolt 26 (to be described).

The inner telescope member slidably supports an outer telescope member, which is formed of a flattened wall 27 and depending part circle wall 28 wherein a seat locking arm window 29 is provided, and an opposed part circle wall 30 respectively. At the ends of flattened wall 27, as by spot welding, seat securing brackets 31 are provided for the seat and tray interconnecting cap screws 32.

At the mid-portion of wall 27, as by spot welded lips 33, a U-shaped bracket is secured. As indicated in Fig. 6, it is formed into a top wall 34 having openings 35 and 36 for the passage of isolated electrical control conduits, and it terminates in edge 37. Wall 34 is also provided with a pair of depending parts 38, indicated in Fig. 5 serving as an anchor for the control levers fulcrum pin 40.

Pin 40 between parts 38 operatively supports a generally three-armed spring loaded lever. It is composed of a manual operating lever 41, electric contact and seat locking arm 42, and return spring contacting arm 43. Pin 40 also supports an adjacent three-armed lever having a manual operating pad 44 in overlapping relation to operative lever 41, an electric contact arm 45, and a return spring contacting arm end 46. Lever 41 and pad 40 are yieldingly held normally in contact with edge 37, by compression return springs 47 and 48 respectively. Electrical contact arms 42 and 45 might be provided with usual electrically isolated top contact surfaces (not shown).

Fig. 5 clearly illustrates the driver's seat end in a locked position. Here, the contact ends of electrical control wires 50 and 51 and also 52 and 53 are isolated, locking arm 42 passing through window 29 is now in the end notch 24, as also indicated in Fig. 8.

Fig. 7 schematically illustrates the well known operative parts and wiring diagram, the driver's side control is illustrated at the rearward travel position of the driver's end of the seat. The passenger end is shown while in the locked position. Here, on the driver's side, the manual operating lever 41 is shown in a manually depressed position, and correspondingly the locking arm 42 is above the seat locking notch 24, completely clearing same.

Inasmuch as arm 42 after being disengaged from notch 24, and after passing through a neutral space, comes in contact with and closes the electric control switch circuit between the ends of conduits 50 and 51, the positive charge from battery 54 flowing through to conduit 55, energizes a solenoid generally at 56. The solenoid when energized is constructed to override the efforts of a valve closing spring 57, holds a needle control valve 58 off its seat, permitting a hydraulic flow.

Solenoid 56 is built into a usual electro-hydraulic power jack having a housing 60 and is arranged to support a hydraulic fluid pipe 61 and anchoring eyelet 62. This end of the jack is operatively mounted on a stationary floor pin 63, a part of stationary cone 64. Housing 60 also contains a usual piston 66 on piston rod 67, terminating in a seat adjusting eyelet 68, and as is clear from Fig. 2, through connecting pin 70 and U-shaped channel bracket 71 secured to transverse wall 9, operatively controls the seat adjustments.

This well known one direction electro-hydraulic power jack operates under the fluid pressure of up to 210 lbs. exerted by a gear pump 72 on an electric motor 73, having a control switch at 74, arranged to be operated by a solenoid generally at 75 on conduit 76. This usual jack being of a one direction construction, for the seat return operation heavy return springs 77 are provided.

The seat supporting pair of racks 15 are composed of three major elements, each having a stationary member secured to the floor, a pivoted intermediate member, and a telescoping sliding member. In operation, as indicated in Fig. 7, while the passenger's end seat adjustment remains locked, the lever 41 position is shown after depression by the driver. This act frees the seat locking engagement between the pivoting and sliding member, and establishes an electric circuit that energizes solenoid 56 (only), this solenoid lifts valve 58 from its seat, allowing the heavy jack return spring 77 to force the operating fluid out of the jack, resulting in the rearward adjustment of the driver's end of the seat. Should the driver press down on his pad 44 that overlaps lever 41, an additional electric circuit energizes also solenoid 75 thereby starting the electric motor 73 and operating fluid pump 72 respectively. The pump forces fluid into the jack, the piston in the jack adjusts the driver's end of seat forwardly. In these two operations the seat takes a slightly diagonal position, to prevent seat rack binding, suitable clearances are provided around the pivot bolts to allow a slight lateral displacement of the pivotal member in relation to the stationary one. The passenger end of seat control operates like the driver's end ones except that it affects only the passenger's end of the seat. In further operation, when the corresponding control means are operated at each end of the seat, the presently generally accepted parallel seat adjustment is arrived at.

Figs. 9 to 13 inclusive show a modification of the invention. Here, for simplicity of presentation the previous indicating numerals are duplicated with a prime exponent.

Applicant illustrates a pair of well known telescoping guide rails arranged to extend and contract on an anti-friction roller 80 and steel balls 81. This construction is not new with the applicant. These guide rails are used by the largest automobile manufacturer, here however, are shown when provided with a pivot bolt 26' operatively interconnecting the stationary member upper wall 16' and lower wall of the pivotable member. Between the bolt and holes in these walls sufficient clearance is provided to permit a slight lateral displacement of these walls at diagonal seat adjustment. To further reduce the friction between the stationary and pivotal members, anti-friction balls 82 in floating ball spacers are indicated. For these balls, the stationary member wall 16' provides un-machined indentation 16''. The lower surface of wall 22' at its ends holds plates 82' as by rivets 82'' their inner unmachined ends serve as races for balls 82. It will be noted, that the spacing between two associated balls is made small for the purpose of allowing a slight lateral displacement between the stationary and pivoting members at diagonal seat adjustment.

The hydraulic jacks here shown in housing 60', serve for the seat end selective diagonal or seat parallel adjustment, each power jack, is at one (rear) end anchored to the automobile floor, and the other end, through the piston rod is operatively connected to its respective seat end. Applicant illustrates the jack in a linkaged frame now in general use. Linkage frame jack mounting was developed to control the seat at sudden deceleration, inasmuch as it is not new with the applicant and does not form a part of the invention for simplicity of presentation applicant believes the detailed description might be omitted.

The present day electro-hydraulically operated seats are now provided with a single jack in a linkaged frame mounting, disposed under the driver's seat. Applicant here proposes the use of two identical jacks and the control switches now in quantity production, and here schematically illustrated in Fig. 10, as a usual spring loaded two direction electric switch on the driver's side seat end, having a selective operating lever 84, therewith integral electric contact arm 85 and neutral position holding spring 86.

When the electric switch lever 84 is moved back (towards Fig. 12), the driver's side solenoid 56' and solenoid 75' become energized. Solenoid 56' opens the hydraulic fluid passage control valve to the driver's side jack piston, and solenoid 75' starts the electric motor 73' and the hydraulic pump, these actions result in the seat driver end forward motion. When the lever 84 is reversed, only the driver's side solenoid 56' is energized, allowing the hydraulic fluid to leave the piston chamber under the force of the heavy return spring 77', resulting in the rearward motion of the driver's end of the seat.

In the preferred form, adjacent to control 84 applicant provides an exact duplicate electric switch selective lever 84' arranged to control the usual electric motor 73' and hydraulic pump. Here however, a duplicate power jack is disposed under the passenger part of the seat, and is controlled by switch 84'.

When the electric switch lever 84' is moved back only, the passenger end of the seat moves forward, for seat adjustment, also increasing the passage width for the rear seat passengers when applied in a usual two door automobile (not shown) when the lever is reversed, the passenger end of seat moves rearwardly.

Applicant positions electric switch arms 84 and 84' on an automobile seat, for vertical operation, as indicated in Fig. 9, in close proximity, to allow the driver to depress or lift both adjacent arms in unison, resulting in the present day parallel fore or aft motion of the seat.

On the passenger end of seat an electric switch and arm, an exact duplicate of 84' (and 84), 84" is positioned, permitting the passenger to adjust her end of the seat for her own convenience without interfering however with the driver's end of the seat.

Applicant here presents a power operated parallel or diagonal seat adjustment of great comfort to the driver and passenger and either of them are in position to adjust the seat to their convenience and alter the seat position independently after the previous seat position becomes fatiguing.

To follow the present day practice applicant mounts the electric switches on the seat ends; for certain applications applicant might mount the switches on the seat front wall, making them accessible for both the driver and passenger and also to allow the operation in unison (not shown).

While I have herein shown and described only certain specific embodiments of my invention and have suggested only certain possible modifications, it will be appreciated that many changes and variations can be made to suit particularly conditions and embodiments of use, without departing from the spirit and scope of my invention.

What applicant claims as his invention:

1. A seat structure for a vehicle body, comprising a seat, a seat rack slide mechanism mounted beneath each end of the seat in supporting relation thereto, each mechanism including a normally stationary member secured to the vehicle floor, a straight slide member secured to the seat, and means directly cooperating with said slide mechanism for pivotally connecting said slide member to the vehicle to permit selective forward and backward parallel and diagonal adjustment of the seat ends, and a pair of electro-hydraulic power jack means at one end anchored to the floor with the other end anchored to the seat, and including a pair of adjacent manually selectively actuatable power jack control means disposed at one end of the seat.

2. The invention disclosed in claim 1 wherein both ends of the seat are provided with selective power jack control means.

3. A seat supporting and adjustment means for a motor vehicle having a transversely extending seat comprising, a seat rack slide mechanism beneath each end of the seat in supporting relation thereto, each mechanism including a normally stationary member secured to the vehicle floor, a telescoping member selectively adjustably mounted on the stationary member whereby each end of the seat can be adjusted forwardly and backwardly selectively for diagonal and parallel adjustment, pivotal mounting means directly cooperating with said slide mechanism for allowing such selective adjustment and seat ends adjusting power means including manually actuatable control means for said power means disposed on the seat.

4. The invention disclosed in claim 3, wherein the seat end adjusting power means includes an hydraulic jack.

5. The invention disclosed in claim 3, wherein the power means comprises two hydraulic jacks selectively controlled by a pair of adjacent manually actuatable means disposed on the seat.

References Cited in the file of this patent

UNITED STATES PATENTS

| Number | Name | Date |
|---|---|---|
| 2,242,247 | Grant | May 20, 1941 |
| 2,283,761 | Richter | May 19, 1942 |
| 2,428,217 | Hedley et al. | Sept. 30, 1947 |
| 2,432,895 | Horton | Dec. 16, 1947 |
| 2,563,220 | Doty | Aug. 7, 1951 |
| 2,568,930 | Parsons | Sept. 25, 1951 |

FOREIGN PATENTS

| Number | Country | Date |
|---|---|---|
| 525,663 | Great Britain | Sept. 2, 1940 |
| 854,183 | France | Jan. 4, 1940 |